(12) United States Patent
Hwang et al.

(10) Patent No.: US 8,625,759 B2
(45) Date of Patent: Jan. 7, 2014

(54) METHOD OF TELEPHONE SWITCHBOARD FOR CONNECTING DIRECTLY THE CALLBACK TO THE EXTENSION OF THE ORIGINAL CALLER

(75) Inventors: Shaw Hwa Hwang, Taipei (TW); Shun Chieh Chang, Taipei (TW)

(73) Assignee: National Taipei University of Technology, Taipei (TW)

( * ) Notice: Subject to any disclaimer, the term of this patent is extended or adjusted under 35 U.S.C. 154(b) by 166 days.

(21) Appl. No.: 13/010,802

(22) Filed: Jan. 21, 2011

(65) Prior Publication Data

US 2012/0189109 A1    Jul. 26, 2012

(51) Int. Cl.
*H04M 15/00*    (2006.01)
(52) U.S. Cl.
USPC .................. 379/133; 379/112.01; 379/214.01; 379/142.06
(58) Field of Classification Search
USPC ............ 379/133, 201, 207.1, 209.01, 210.01, 379/221.02, 112.01, 214.01, 142.06, 207.15
See application file for complete search history.

(56) References Cited

U.S. PATENT DOCUMENTS

| | | | | |
|---|---|---|---|---|
| 5,533,102 | A * | 7/1996 | Robinson et al. | 379/88.25 |
| 6,208,723 | B1 * | 3/2001 | Frey, Jr. | 379/201.01 |
| 2009/0279683 | A1 * | 11/2009 | Gisby et al. | 379/201.02 |

* cited by examiner

*Primary Examiner* — Duc Nguyen
*Assistant Examiner* — Yosef K Laekemariam
(74) *Attorney, Agent, or Firm* — Bacon & Thomas, PLLC

(57) ABSTRACT

The present invention provides a "Phone Log" in a telephone switchboard for recording the extension numbers, the phone numbers dialed by the extension numbers and the accumulated times. When there is an outside call, the telephone switchboard will first check the "Phone Log" whether the telephone number of the outside call is on the "Phone Log" or not; if the telephone number of the outside call is on the "Phone Log", then the outside call (callback) is connected directly to the corresponding extension; otherwise the outside call will be connected to an auto-attendant for connecting. As the accumulated time of each of the records reaches a time limit, the related record will be cleared out. After the callback is picked up by the corresponding extension successfully, the related record is also cleared out.

4 Claims, 7 Drawing Sheets

METHOD OF TELEPHONE SWITCHBOARD FOR CONNECTING DIRECTLY THE CALLBACK TO THE EXTENSION OF THE ORIGINAL CALLER

FIELD OF THE INVENTION

The present invention relates to a function design of a telephone switchboard, and more particularly to a method of telephone switchboard for connecting directly the callback to the extension of the original caller.

BACKGROUND OF THE INVENTION

Conventional connections of a telephone switchboard are shown in FIG. 1~FIG. 9.

Referring to FIG. 1, a telephone switchboard 1 (with telephone number 02-27712171) of Taipei Technology University has 38 outside connections, 1000 internal extensions (such as extensions 2178, 2104, 3178 . . . . ) and an auto-attendant 2.

A user uses extension 2178 for dialing to a mobile phone 0935-125356 through telephone switchboard 1 and Chung-Hwa Communication network 3, as shown in FIG. 2.

The subscriber of the mobile phone 0935-125356 does not accept the phone call, therefore a message "A call from 0227712171 was not accepted" is left in the mobile phone, as shown in FIG. 3.

Referring to FIG. 4, later on the subscriber of the mobile phone 0935-125356 notices the message "A call from 0227712171 was not accepted", so he calls back the telephone number 0227712171 to the telephone switchboard 1 of Taipei Technology University through Chung-Hwa Communication network 3.

Referring to FIG. 5, the telephone switchboard 1 connects the call from the mobile phone 0935-125356 to the auto-attendant 2, and then the auto-attendant 2 sends out a voice response "This is Taipei Technology University, please dial the extension number" as shown in FIG. 6.

If the subscriber of the mobile phone 0935-125356 knows that it was the calling from extension 2178, he will of course dial the number 2178, as shown in FIG. 7.

Referring to FIG. 8, the auto-attendant 2 connects for the subscriber of the mobile phone 0935-125356 to the extension 2178 through the telephone switchboard 1. When the user of the extension 2178 picks up the phone call, the auto-attendant 2 will then drop out itself, and let the subscriber of the mobile phone 0935-125356 and the user of the extension 2178 communicate, as shown in FIG. 9.

But if the subscriber of the mobile phone 0935-125356 does not know who called him, he cannot dial a extension number after the voice response of the auto-attendant 2, even if he can ask for the assistance of an operator, he cannot ask the operator to connect which extension.

The above described condition happens frequently in modern life, especially in a big company, government or university that has thousands of extension.

U.S. Pat. No. 6,208,723 disclosed telecommunications systems and methods for automatically ringing a subscribers telephone once the subscriber's line becomes idle, and specifically to allowing an attendant to implement a recall feature for a third party when that party's line is busy, but this is not the solution to the above-described disadvantage.

SUMMARY OF THE INVENTION

The object of the present invention is to provide a method of telephone switchboard for connecting directly a callback to an extension of the original caller, comprising steps as below:

a. the telephone switchboard operates to check if there is any outside call, If no outside call, go back to check again, otherwise the telephone switchboard checks the "Phone Log" to see if a telephone number of the outside call is on the "Phone Log";

b. if the telephone number of the outside call is on the "Phone Log", then the telephone switchboard treats the ouside call as a callback, and then connects the callback to a corresponding extension and waits for picking up of the corresponding extension; if the corresponding extension picks up the callback, then communication begins; if the corresponding extension does not pick up the callback, then the telephone switchboard transfers the callback to an auto-attendant, the auto-attendant will then operate to handle connecting;

c. in step a, if there is no record of the telephone number of the outside call on the "Phone Log", then the telephone switchboard transfers the outside call to the auto-attendant, the auto-attendant will then operate to handle connecting.

A record on the "Phone Log" of the telephone switchboard is cleared out after a corresponding accumulated time reaches a time limit.

After the callback is picked up by the corresponding extension successfully, the related record is also cleared out.

DETAILED DESCRIPTIONS OF THE PREFERRED EMBODIMENTS

Figure 1:
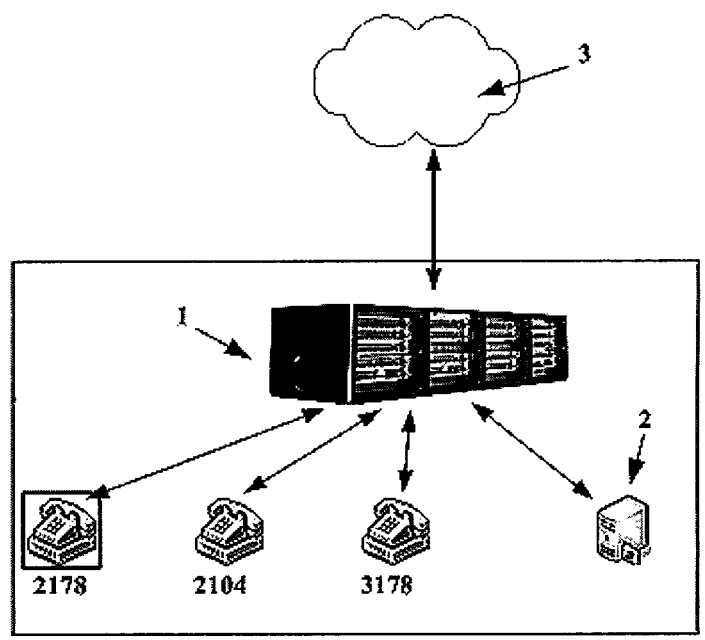
FIG. 1 shows a telephone switchboard (with telephone number 02-27712171) of Taipei Technology University has 38 outside connections, 1000 internal extensions and an auto-attendant.
Figure 2:
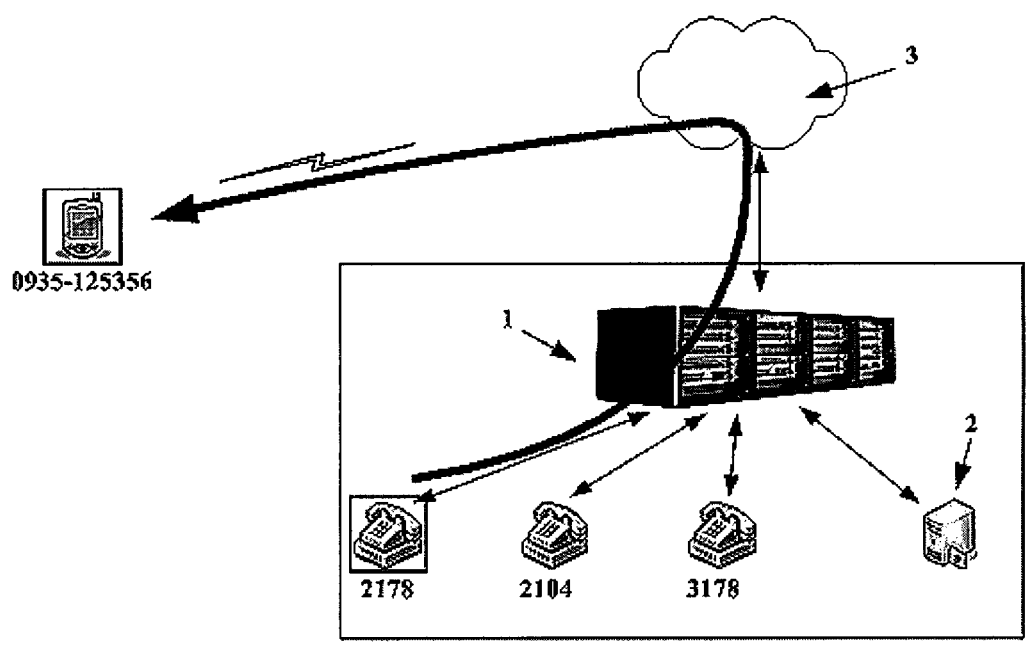
FIG. 2 shows a user of Taipei Technology University uses extension 2178 for dialing to a mobile phone 0935-125356 through telephone switchboard and Chung-Hwa Communication network.
Figure 3:
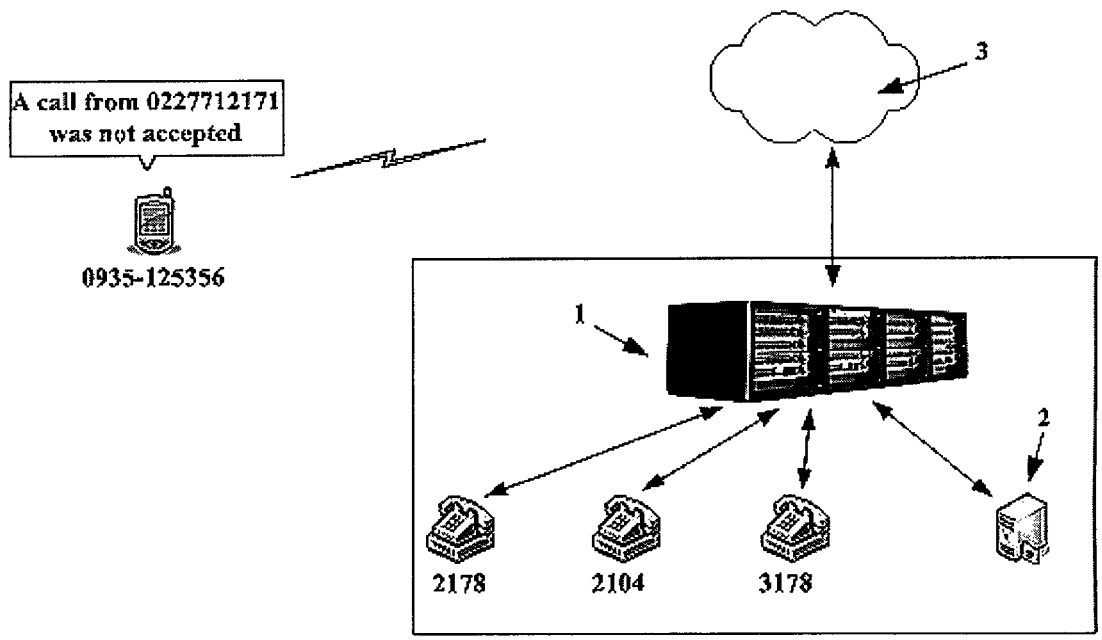
FIG. 3 shows the subscriber of the mobile phone 0935-125356 does not accept the phone call, therefore a message "A call from 0227712171 was not accepted" is left in the mobile phone.
Figure 4:
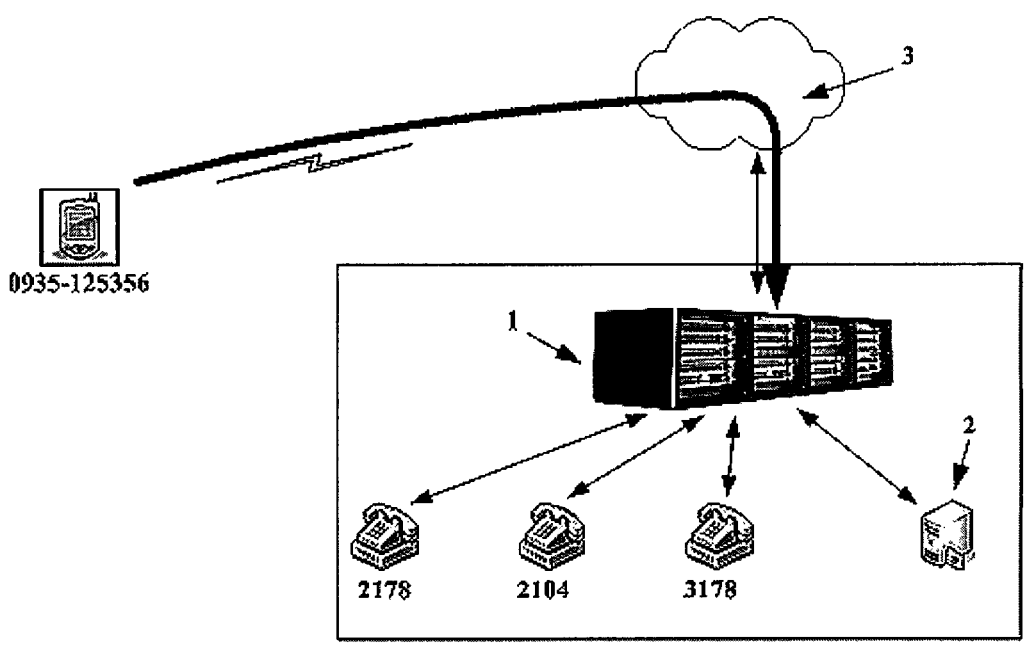
FIG. 4 shows the subscriber of the mobile phone 0935-125356 calls back the telephone number 0227712171 to the telephone switchboard of Taipei Technology University through Chung-Hwa Communication network.
Figure 5:
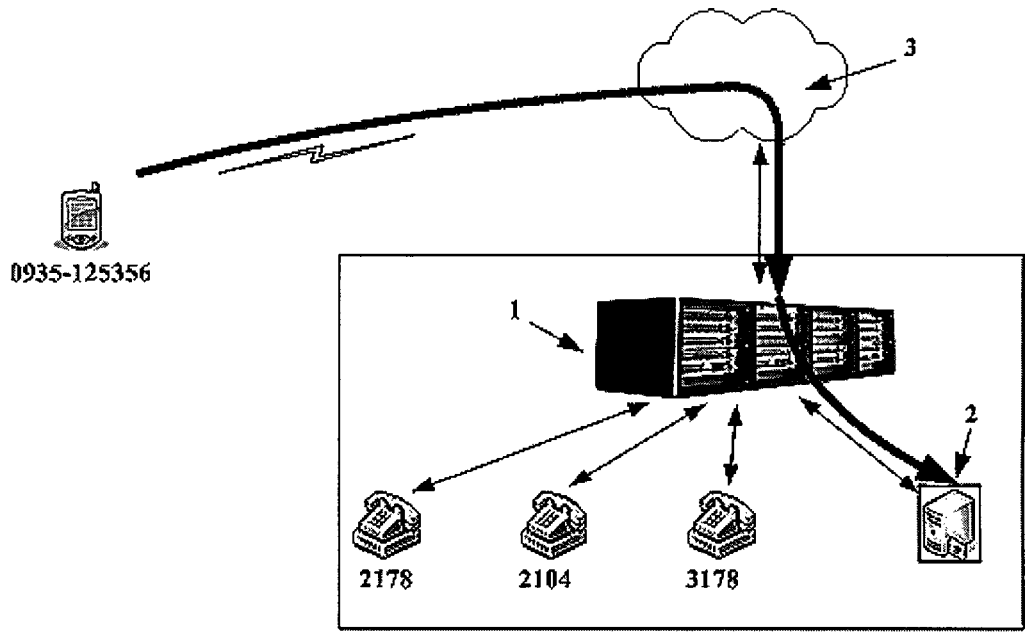
FIG. 5 shows the telephone switchboard connects the call from the mobile phone 0935-125356 to the auto-attendant.
Figure 6:
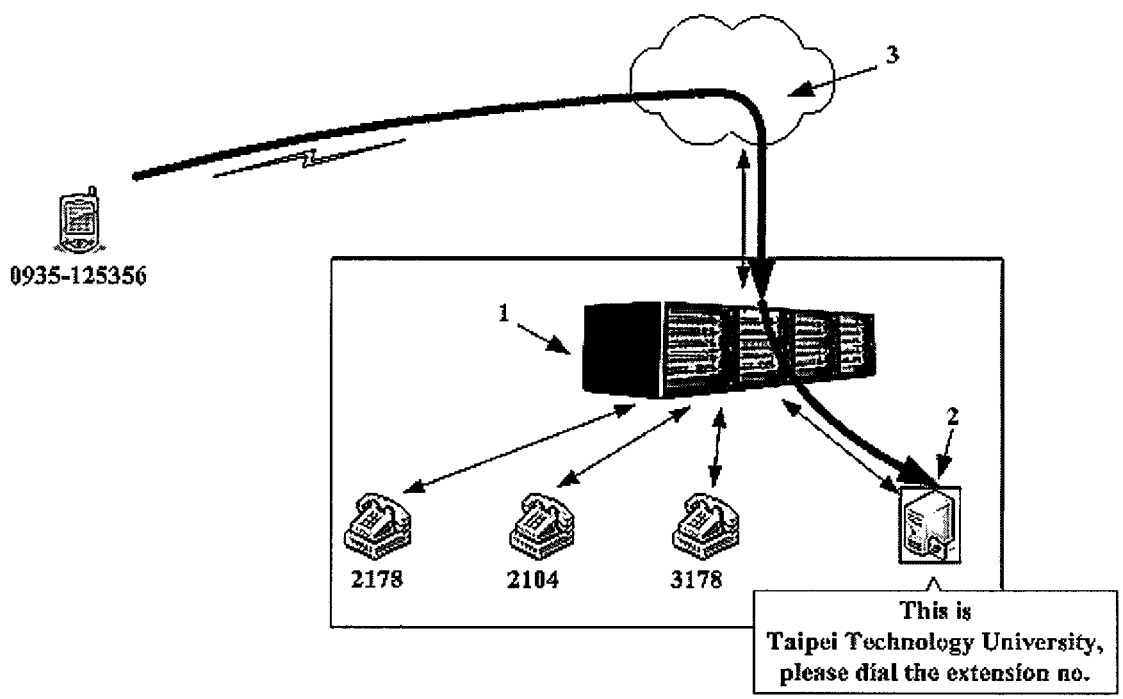
FIG. 6 shows the auto-attendant sends out a voice response "This is Taipei Technology University, please dial the extension number".
Figure 7:
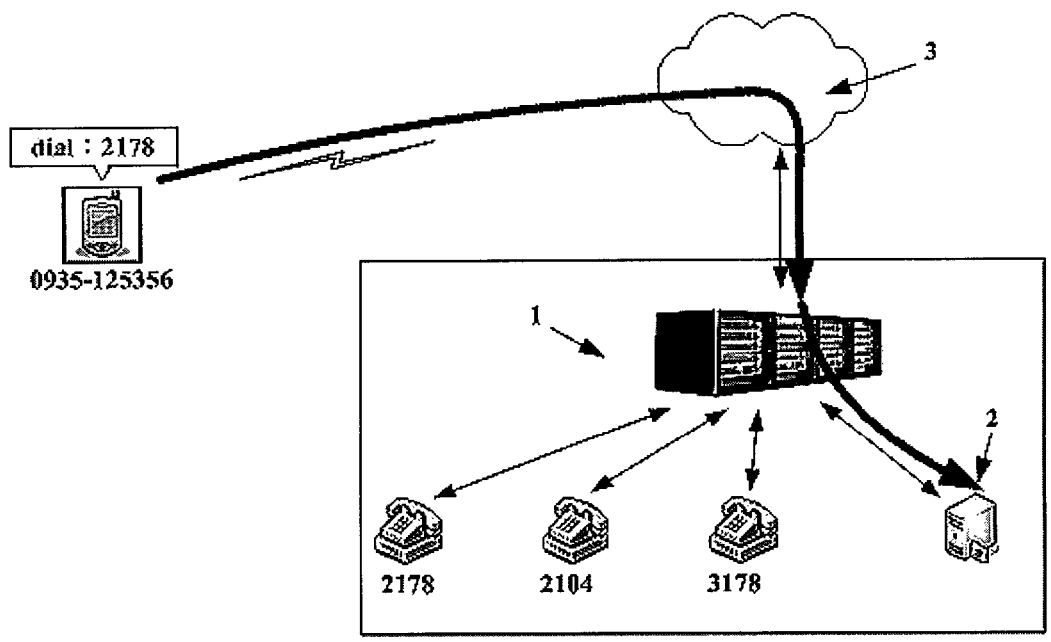
FIG. 7 shows the subscriber of the mobile phone 0935-125356 dials the number 2178.
Figure 8:
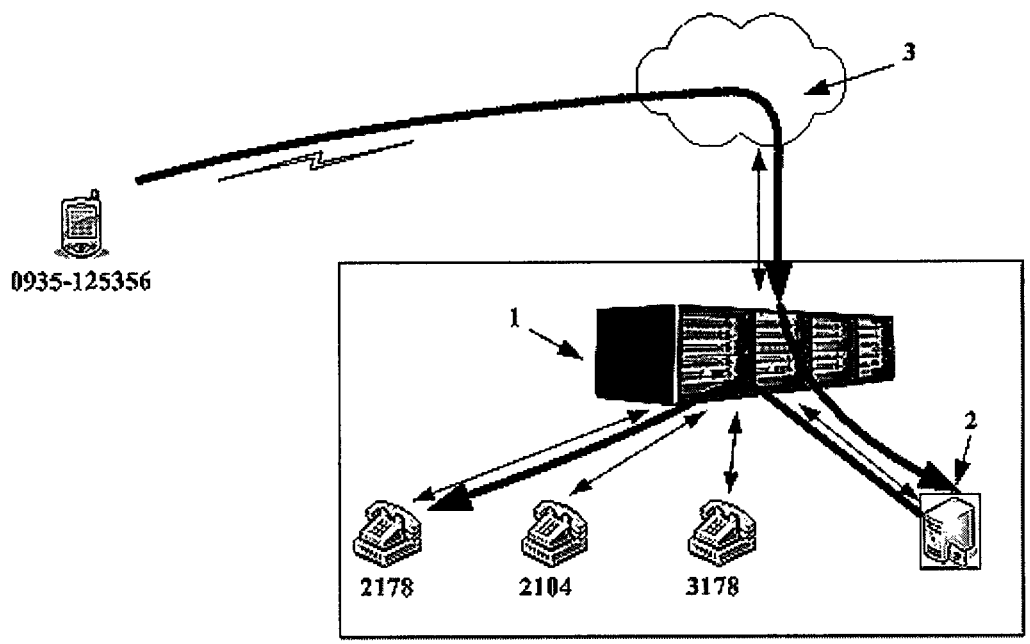
FIG. 8 shows the auto-attendant connects for the subscriber of the mobile phone 0935-125356 to the extension 2178 through the telephone switchboard.
Figure 9:
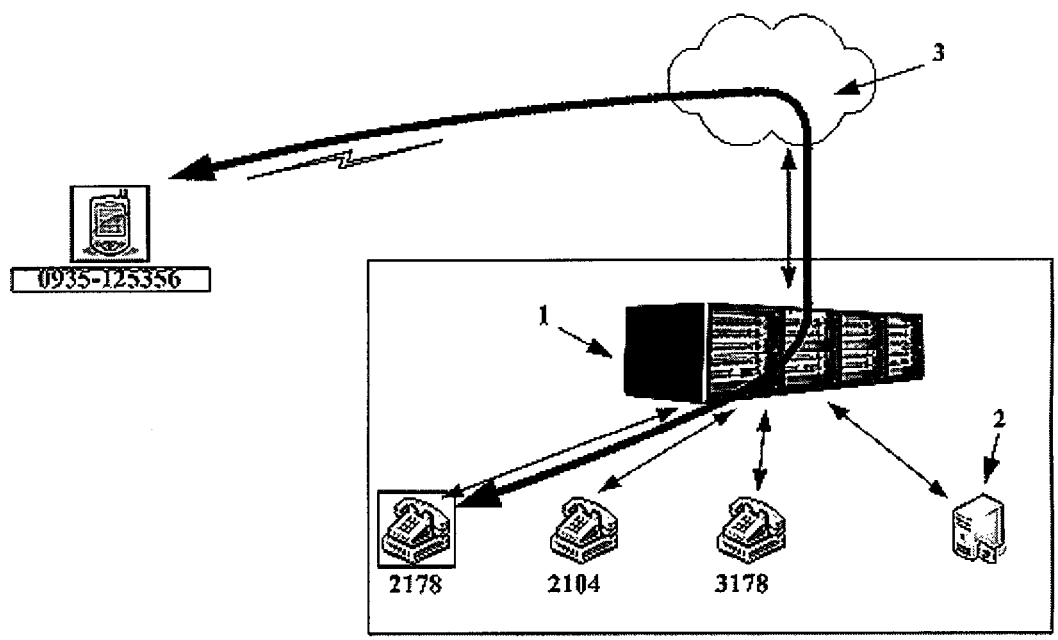
FIG. 9 shows when the user of the extension 2178 picks up the phone call, the auto-attendant will then drop out itself, and let the subscriber of the mobile phone 0935-125356 and the user of the extension 2178 communicate.
Figure 10:
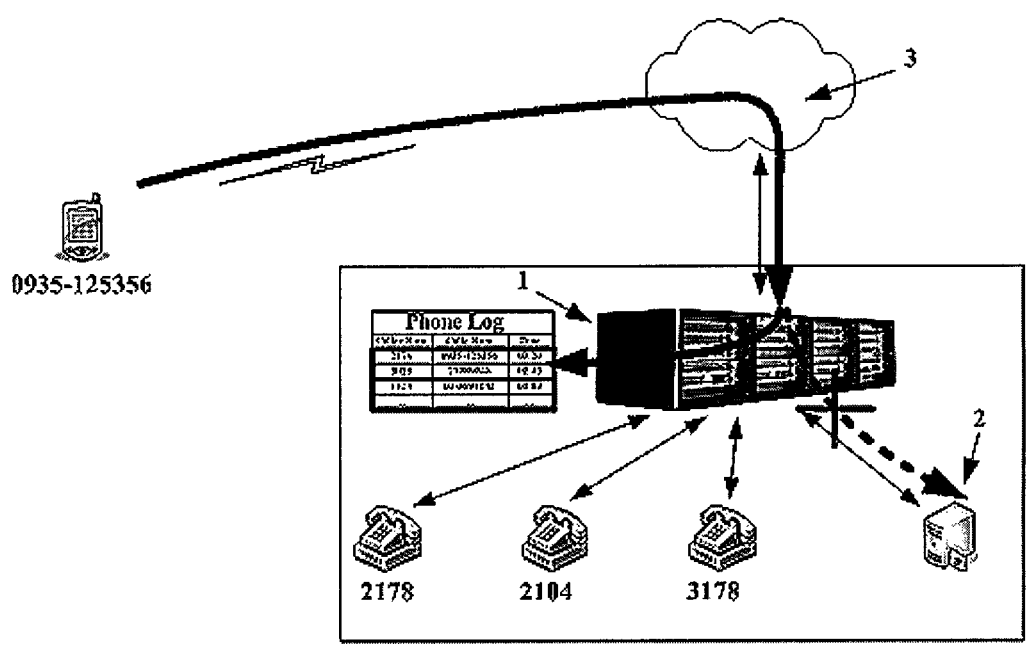
FIG. 10 shows a "Phone Log" is added in the telephone switchboard of the present invention.

Referring to FIG. 10, the present invention provides a new design for conventional telephone switchboard 1, a "Phone Log" is added in the telephone switchboard 1, as shown below:

| Phone Log | | |
|---|---|---|
| extension number | the phone number dialed by the extension number | accumulated time |
| 2178 | 0935-125356 | 03:20 |
| 3029 | 27789748 | 02:43 |
| 1324 | 03-5593142 | 01:03 |
| ... | ... | ... |
| ... | ... | ... |

Figure 11:
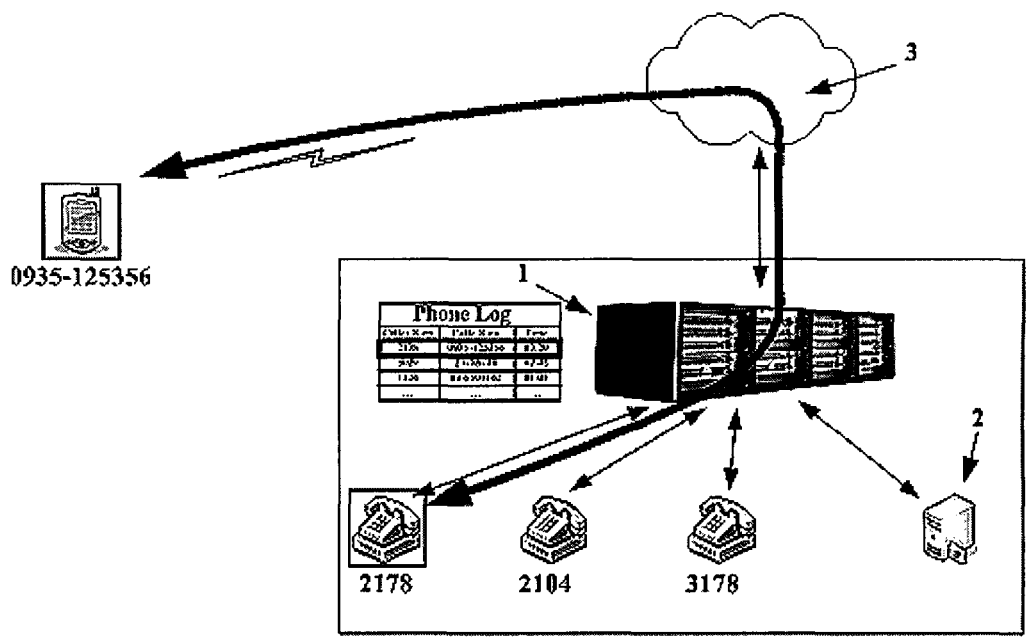
FIG. 11 shows the telephone switchboard finds that the extension 2178 had called the mobile phone 0935-125356 through the telephone switchboard, so the telephone switchboard will automatically connect the callback from the subscriber of the mobile phone 0935-125356 to the extension 2178.

The table above shows that the extension 2178 had called the mobile phone 935-125356, but the call was not accepted, time has been accumulated for 03:20. When the subscriber of the mobile phone 0935-125356 notices the message "A call from 0227712171 was not accepted", so he calls back 0227712171 to the telephone switchboard 1 of Taipei Technology University through Chung-Hwa Communication network 3. The telephone switchboard 1 will then first check the "Phone Log", and find that the extension 2178 had called the mobile phone 0935-125356 through the telephone switchboard 1, so the telephone switchboard 1 will automatically connect the callback from the subscriber of the mobile phone 0935-125356 to the extension 2178, as shown in FIG. 11.

Figure 12:
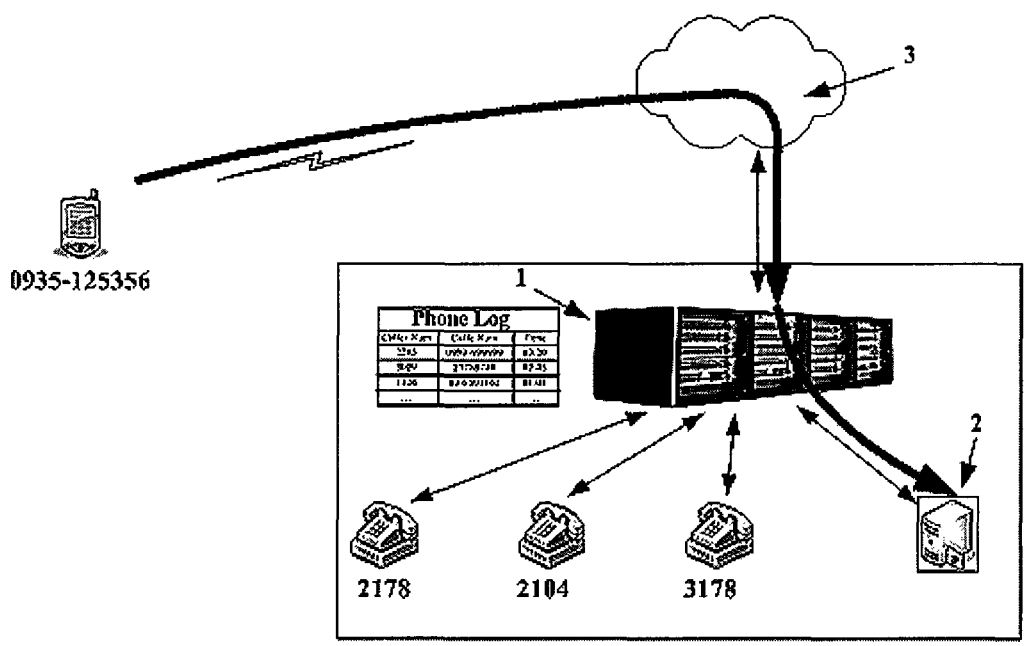
FIG. 12 shows the telephone switchboard finds that there is no record of 0935-125356, the telephone switchboard will then transfer the call from 0935-125356 to the auto-attendant.

When the telephone switchboard 1 checks the "Phone Log", and finds that there is no record of 0935-125356, the telephone switchboard 1 will then transfer the call from 0935-125356 to the auto-attendant, as shown in FIG. 12.

Figure 13:
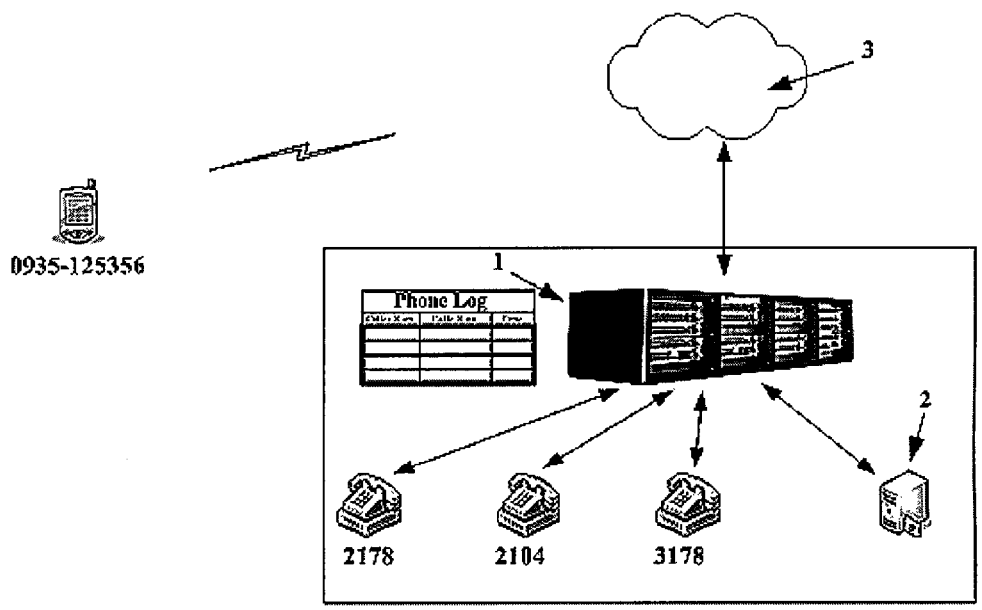
FIG. 13 shows the records on the "Phone Log" of the telephone switchboard 1 will be cleared out after the accumulated time reaches a time limit.

The records on the "Phone Log" of the telephone switchboard 1 will not be kept forever, but will be cleared out after the accumulated time reaches a time limit (e.g. 24 hours or 48 hours), as shown in FIG. 13. After the callback is picked up by the original extension successfully, the related record will also be cleared out.

Figure 14:
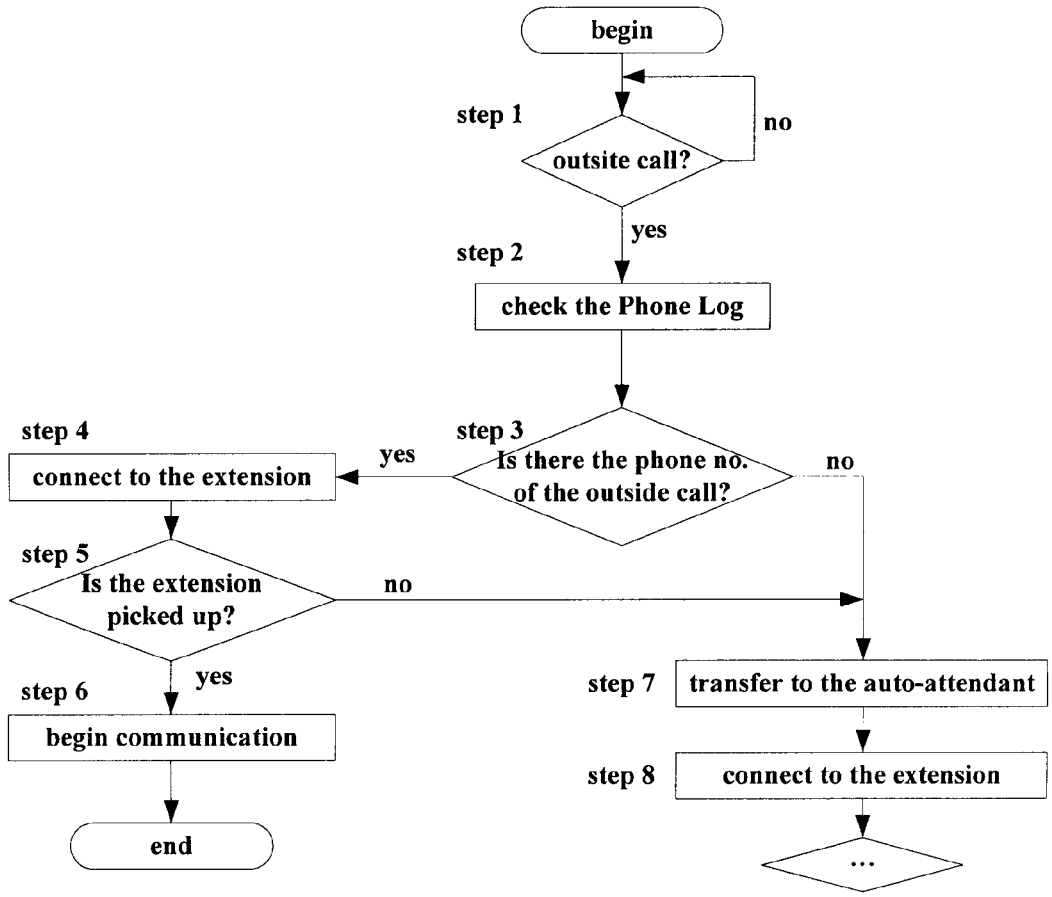
FIG. 14 shows the flow chart of the operation of the telephone switchboard after the "Phone Log" is added in the telephone switchboard.

After the "Phone Log" is added in the telephone switchboard 1, the flow chart of the operation of the telephone switchboard 1 is shown in FIG. 14.

Referring to FIG. 14, the telephone switchboard 1 operates to check if there is any outside call (step 1), If no outside call, go back to check again, otherwise the telephone switchboard 1 will check the "Phone Log" (step 2) to see if the telephone number of the outside call is on the "Phone Log" (step 3); If yes, then the telephone switchboard 1 connects the outside call to the corresponding extension (step 4) and waits for the picking up of the corresponding extension (step 5); if the corresponding extension picks up the ouside call, then communication begins (step 6); if the corresponding extension does not pick up the ouside call, then the telephone switchboard 1 transfers the outside call to the auto-attendant (step 7), the auto-attendant will then operate to handle the connecting (step 8). In step 3, if there is no record of the telephone number of the outside call on the "Phone Log", then the telephone switchboard 1 transfers the outside call to the auto-attendant (step 7), the auto-attendant will then operate to handle the connecting (step 8).

The telephone switchboard 1 of the present invention can be a conventional telephone switchboard or an interne telephone switchboard.

The scope of the present invention depends upon the following claims, and is not limited by the above embodiments.

What is claimed is:

1. A method of telephone switchboard, wherein a "Phone Log" is added in the telephone switchboard for recording extension numbers that have dialed an outside telephone number, telephone numbers dialed by the extension numbers, and accumulated times, comprising the steps of:
   a. the telephone switchboard operates to check if there is any outside call, wherein if there is no outside call, the telephone switchboard goes back to check again, otherwise the telephone switchboard checks the "Phone Log" to see if a telephone number of the outside call is on the "Phone Log";
   b. if the telephone number of the outside call is on the "Phone Log", then the telephone switchboard treats the outside call as a callback, and then connects the callback to a corresponding extension and waits for picking up of the corresponding extension; wherein if the corresponding extension picks up the callback, then communication begins; and if the corresponding extension does not pick up the callback, then the telephone switchboard transfers the callback to an auto-attendant, and the auto-attendant then operates to handle connecting;
   c. in step a, if there is no record of the telephone number of the outside call on the "Phone Log", then the telephone switchboard transfers the outside call to the auto-attendant, and the auto-attendant then operates to handle connecting wherein when an original caller uses the corresponding extension for dialing an outside telephone number through the telephone switchboard, the callback is directly connected to the corresponding extension even though the outside telephone number did not accept the call from the corresponding extension and did not know the extension number of the original caller.

2. The method of telephone switchboard for connecting directly a callback to an extension of an original caller according to claim 1, wherein a record on the "Phone Log" of the telephone switchboard is cleared out after a corresponding accumulated time reaches a time limit.

3. The method of telephone switchboard for connecting directly a callback to an extension of an original caller according to claim 1, wherein after the callback is picked up by the corresponding extension successfully, the related record is cleared out.

4. The method of telephone switchboard for connecting directly a callback to an extension of an original caller according to claim 1, wherein the telephone switchboard is a conventional telephone switchboard or an internet telephone switchboard.

* * * * *